US011320663B2

(12) United States Patent
Fan et al.

(10) Patent No.: US 11,320,663 B2
(45) Date of Patent: May 3, 2022

(54) DIFFRACTIVE OPTICAL ELEMENTS MADE OF CONDUCTIVE MATERIALS

(71) Applicant: OmniVision Technologies, Inc., Santa Clara, CA (US)

(72) Inventors: Chun-Sheng Fan, Zhudong Township (TW); Wei-Feng Lin, Hsinchu County (TW)

(73) Assignee: Omni Vision Technologies, Inc., Santa Clara, CA (US)

( * ) Notice: Subject to any disclaimer, the term of this patent is extended or adjusted under 35 U.S.C. 154(b) by 219 days.

(21) Appl. No.: 16/430,517

(22) Filed: Jun. 4, 2019

(65) Prior Publication Data
US 2020/0387002 A1 Dec. 10, 2020

(51) Int. Cl.
*G02B 5/18* (2006.01)
*G02B 27/42* (2006.01)
(Continued)

(52) U.S. Cl.
CPC .......... *G02B 27/0944* (2013.01); *G06T 7/521* (2017.01); *H04N 13/128* (2018.05)

(58) Field of Classification Search
CPC .............. G02B 27/0944; G02B 27/095; G02B 27/0955; G02B 27/0961; G02B 27/0966; G02B 27/0972; G02B 27/0977; G02B 27/0983; G02B 27/0988; G02B 27/0994; G02B 6/02; G02B 5/008; G02B 5/025; G02B 5/18; G02B 5/1814; G02B 5/1828; G02B 5/1876; G02B 26/0808; G06T 7/521; H04N 13/128
See application file for complete search history.

(56) References Cited

U.S. PATENT DOCUMENTS 9,098,931 B2 8/2015 Shpunt et al.
10,754,232 B2 * 8/2020 Chen ....................... H01L 33/64
(Continued)

FOREIGN PATENT DOCUMENTS

WO WO-2016161351 A1 * 10/2016 ............... G02C 7/08

*Primary Examiner* — Darryl J Collins
*Assistant Examiner* — Tamara Y. Washington

(57) ABSTRACT

A diffractive optical element (DOE) comprises a first part comprising a first transparent non-conductive base and a first transparent conductive layer disposed on the first transparent non-conductive base and a second part comprising a second transparent non-conductive base and a second transparent conductive layer disposed on the second transparent non-conductive base. The first transparent conductive layer and the second transparent conductive layer have periodical patterns of thickness for diffracting light. Spacers separate the first part and the second part. The first part and the second part are positioned such that the first transparent conductive layer is facing the second transparent conductive layer. A first end of the first transparent conductive layer is electrically connected to a first terminal of a capacitance monitor, and a second end of the second transparent conductive layer is electrically connected to a second terminal of the capacitance monitor. The capacitance monitor constantly monitors the capacitance across the first transparent conductive layer and the second transparent conductive layer during an operation comprising diffracting a laser beam.

19 Claims, 6 Drawing Sheets

(51) Int. Cl.
*G02B 27/09* (2006.01)
*H04N 13/128* (2018.01)
*G06T 7/521* (2017.01)

(56) References Cited

U.S. PATENT DOCUMENTS

| | | |
|---|---|---|
| 11,009,634 B2 * | 5/2021 | Park .................. G02F 1/133514 |
| 2008/0240502 A1 | 10/2008 | Freedman et al. |
| 2017/0199144 A1 | 7/2017 | Noble et al. |
| 2019/0056217 A1 * | 2/2019 | Chen .................. G02B 27/4266 |
| 2019/0131771 A1 | 5/2019 | Wan |
| 2019/0257984 A1 * | 8/2019 | She .................... H01L 41/0478 |

* cited by examiner

DIFFRACTIVE OPTICAL ELEMENTS MADE OF CONDUCTIVE MATERIALS

FIELD OF THE INVENTION

This invention relates to diffractive optical elements (DOEs) made of conductive materials, and more specifically relates to DOEs made of conductive materials for generating structured light for 3D imaging.

BACKGROUND OF THE INVENTION

Optical modules capable of capturing 3D image of human face have been used for unlocking a smart phone and for various security applications. A non-visible IR laser beam is commonly used. A collimated IR laser light passes through a diffractive optical element (DOE) such as a grating. The laser light is diffracted by the DOE forming structured light illuminating an object such as a human face. From the structured light distorted by the human face, the 3D profile of the human face can be reconstructed. The reconstructed 3D profile of the human face is then used for unlocking the device.

Although the diffracted laser light may not be dangerous to human, if the laser light is not diffracted correctly, direct illumination by the collimated laser beam may be dangerous because it is not diffused and has higher intensity. If the DOE is defective and does not correctly diffract light, the device would have high risk in causing injury to the eye. The undiffracted laser beam may hit the eye. Especially, the IR laser beam is not visible.

Accordingly, the detection of defective DOE during an operation comprising diffracting a laser beam is needed. DOEs having capability of detecting the defect during operation comprising diffracting a laser beam are demanded.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
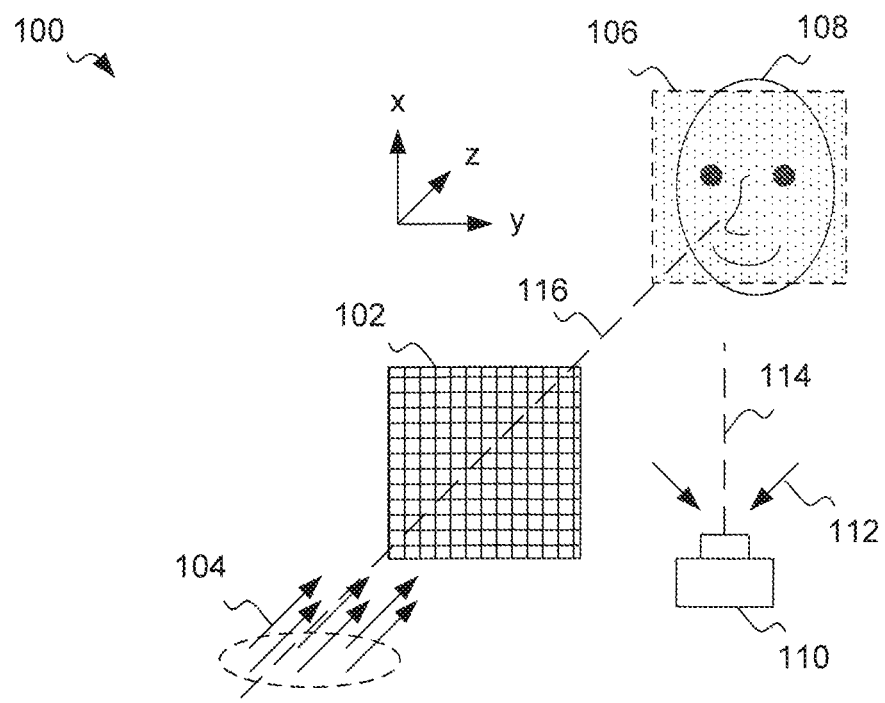
FIG. 1 shows an exemplary embodiment of 3D imaging based on structured light, according to the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

FIG. 1 shows an exemplary embodiment 100 of 3D imaging based on structured light, according to the present invention. A coherent collimated light 104 normally incident on and transmit through a diffractive optical element (DOE) 102 generating a diffraction pattern 106 on an object 108. Coherent collimated light 104 may be an IR laser beam or a visible laser beam. Diffraction pattern 106 may be a periodical pattern, such as an evenly distributed 2D dot pattern or 1D fringe pattern, or any predetermined pattern. Periodical diffraction pattern 106 is commonly known as structured light.

For convenience in understanding the disclosure, a Cartesian coordinate is given for reference in FIG. 1 and other figures. DOE 102 is parallel to the x-y plane, and a normal 116 of DOE 102 is parallel to the z axis.

Periodical diffraction pattern 106 is distorted according to the 3D surface profile of an object 108. A camera 110 captures light 112 reflected from object 108. An optical axis 114 of camera 110 is not parallel to the z axis. Camera 110 captures the image of diffraction pattern 106, which is distorted by the 3D surface profile of object 108. A computer or processor (not shown) analyzes the captured distorted periodical diffraction pattern, and produces a 3D image of object 108. For example, object 108 may be a human face, and the produced 3D image may be used for 3D face recognition in a smart phone.

In the event of DOE 102 defective during the operation of 3D imaging, coherent collimated light 104 may not be correctly diffracted by DOE 102. Coherent collimated light 104 may be directly incident on object 108. If object 108 is a human face, coherent collimated light 104 may hit the eye of the human and cause serious injury. For example, DOE may be defective because of the heat generated in the operation.

Figure 2A:
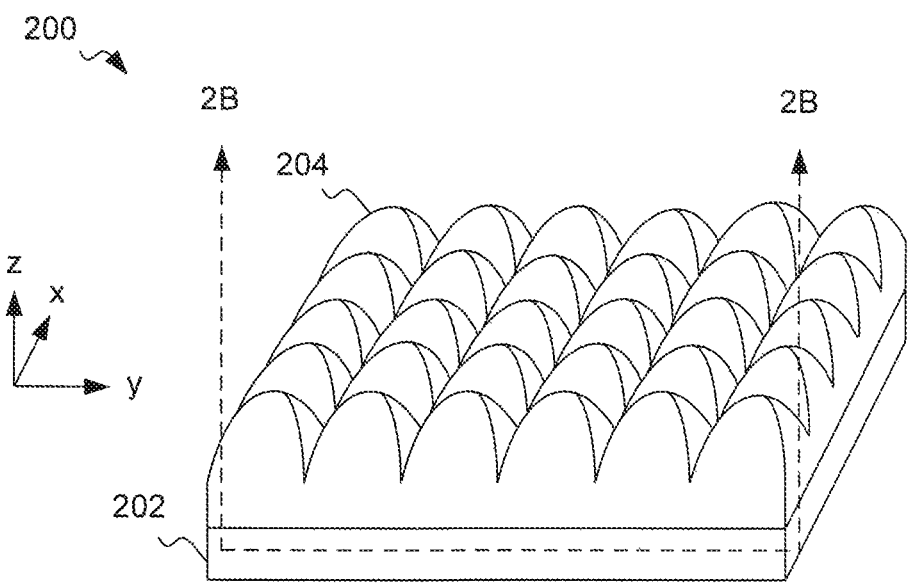
FIG. 2A shows an exemplary DOE comprising a transparent non-conductive base and a transparent conductive layer made of conductive polymers, according to an embodiment of the present invention.

FIG. 2A shows an exemplary DOE 200, which may be DOE 102 in FIG. 1, according to an embodiment of the present invention. DOE 200 comprises a transparent non-conductive base 202. For example, base 202 may be made of glass, quartz, plastic or any suitable materials. A transparent conductive layer 204 is disposed on base 202. For example, transparent conductive layer 204 may be made of conductive polymers including Polythiophene, Polyaniline, Polypyrrole, Polyacetylene, Polyethyne, and the like. Conductive polymers are the subject of the 2000 Nobel Prize in chemistry.

FIG. 2A shows exemplary DOE 200 comprising transparent conductive layer 204 having 2D periodical pattern of thickness in the x axis and y axis for diffracting light. Polythiophene is liquid type before curing. Polythophene may be cured using UV light. For example, transparent conductive layer 204 may be formed by nano-imprint lithography process using Polythiophene or the like.

Figure 2B:
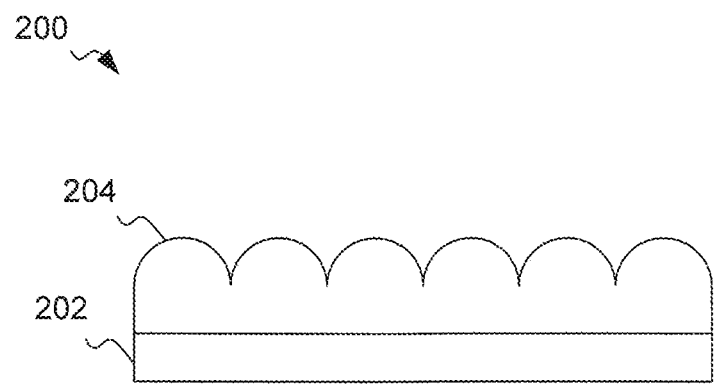
FIG. 2B shows a cross-section 2B-2B in FIG. 2A, according to an embodiment of the present invention.

FIG. 2B shows a cross-section 2B-2B in FIG. 2A, according to an embodiment of the present invention. FIG. 2B shows exemplary DOE 200 comprising transparent non-conductive base 202 and transparent conductive layer 204. Transparent conductive layer 204 comprises repeated tiny domes.

Figure 3A:
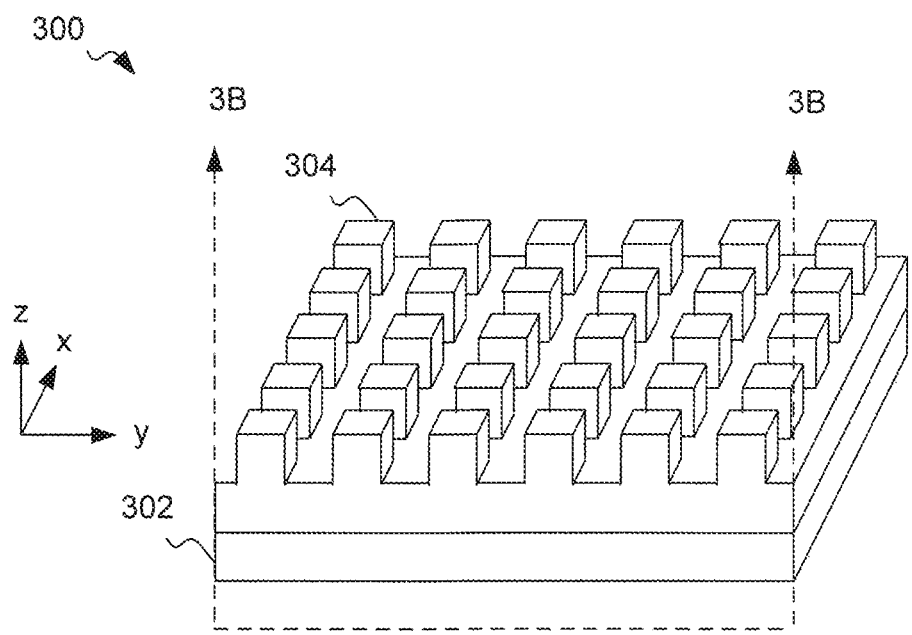
FIG. 3A shows an exemplary DOE comprising a transparent non-conductive base and a transparent conductive layer made of conductive polymers, according to an embodiment of the present invention.

Similar to FIG. 2A, FIG. 3A shows an exemplary DOE 300, which may be DOE 102 in FIG. 1, according to an embodiment of the present invention. DOE 300 comprises a transparent non-conductive base 302. For example, base 302 may be made of glass, quartz, plastic or any suitable materials. A transparent conductive layer 304 is disposed on base 302. For example, transparent conductive layer 304 may be made of conductive polymers including Polythiophene, Polyaniline, Polypyrrole, Polyacetylene, Polyethyne, and the like.

FIG. 3A shows exemplary DOE 300 comprising transparent conductive layer 304 having 2D periodical pattern of thickness in the x axis and y axis for diffracting light. Polythiophene is liquid type before curing. Polythophene may be cured using UV light. For example, transparent conductive layer 304 may be formed by nano-imprint lithography process using Polythiophene or the like.

Figure 3B:
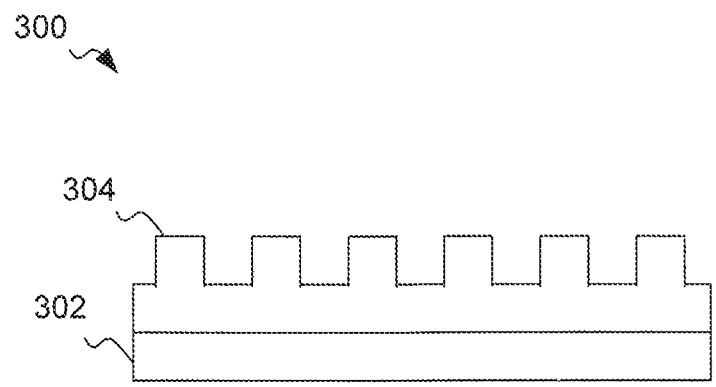
FIG. 3B shows a cross-section 3B-3B in FIG. 3A, according to an embodiment of the present invention.

FIG. 3B shows a cross-section 3B-3B in FIG. 3A, according to an embodiment of the present invention. FIG. 3B shows exemplary DOE 300 comprising transparent non-conductive base 302 and transparent conductive layer 304. Transparent conductive layer 304 comprises repeated tiny boxes.

Figure 4:
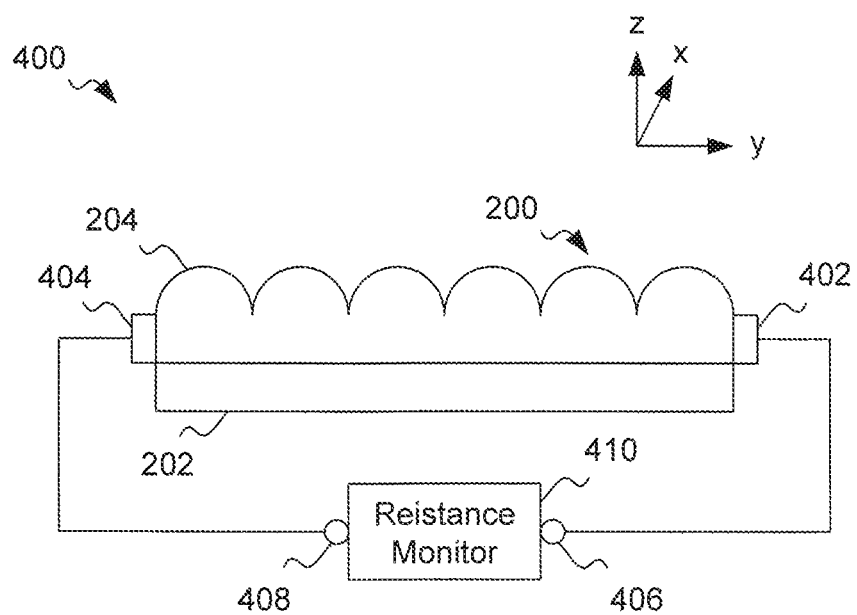
FIG. 4 shows an embodiment for detecting whether the DOE is defective, according to the present invention.

FIG. 4 shows an exemplary embodiment 400 for detecting whether the DOE is defective according to the present invention. For example, the DOE may be DOE 200 of FIG. 2B comprising transparent conductive layer 204 and transparent non-conductive base 202. It is appreciated that the DOE may be DOE 300 of FIG. 3B. A first pad 402 may be mounted to conductive layer 204 at a first end, and a second pad 404 is mounted to conductive layer 204 at a second end. Pads 402 and 404 may have elongated shapes along x axis. First pad 402 is electrically connected to a first terminal 406 of a resistance monitor 410. Second 404 is electrically connected to a second terminal 408 of resistance monitor 410. Pads 402 and 404 are optional. Resistance monitor 410 may be directly connected to the first and second ends of conductive layer 204 through its first and second terminals.

Prior to including DOE 200 in a product, for example, a product using embodiment 100 of FIG. 1, the electrical resistance of DOE 200 is measured. During an operation comprising diffracting a laser beam as shown in FIG. 1, the resistance of DOE 200 is constantly monitored by resistance monitor 410. If the monitored resistance changes from the value of the resistance measured before including DOE 200 in product, the operation may be terminated, because DOE 200 may be defective. DOE 200 is for producing structured light for 3D imaging.

Figure 5:
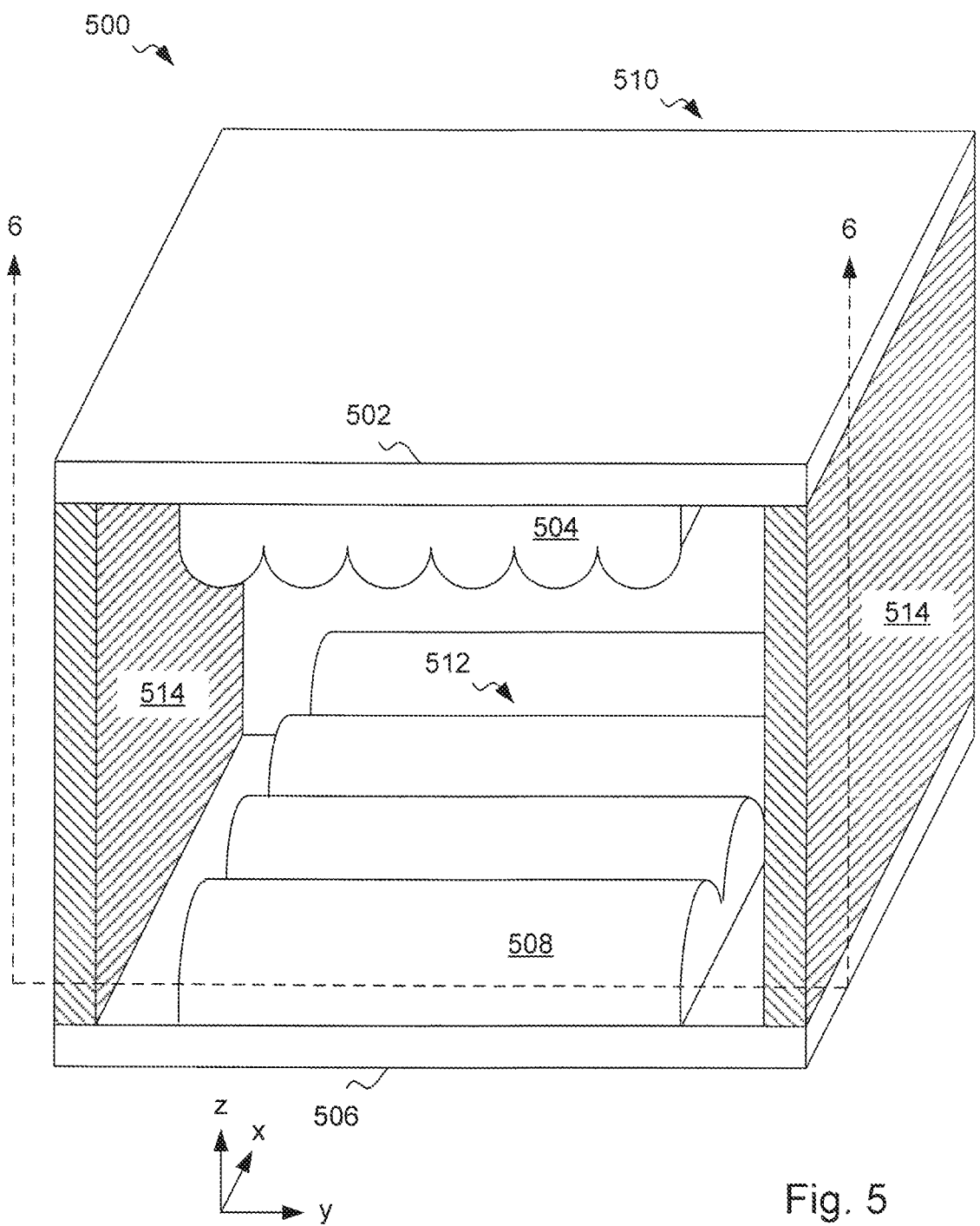
FIG. 5 shows an exemplary DOE comprising a first part, a second part, and spacers interposed between the first part and the second part, according to an embodiment of the present invention.

FIG. 5 shows an exemplary DOE 500, which may be DOE 102 in FIG. 1, according to an embodiment of the present invention. DOE 500 comprises a first part 510 and a second part 512. First part 510 comprises a first transparent non-conductive base 502. For example, first base 502 may be made of glass, quartz, plastic or any suitable materials. A first transparent conductive layer 504 is disposed on first base 502. For example, first transparent conductive layer 504 may be made of conductive polymers including Polythiophene, Polyaniline, Polypyrrole, Polyacetylene, Polyethyne, and the like. After first part 510 is made, first part 510 is positioned that first base 502 is at the top and first conductive layer 504 is at the bottom along the z axis. First part 510 is parallel to the x-y plane as shown in FIG. 5.

Second part 512 comprises a second transparent non-conductive base 506. For example, second base 502 may be made of glass, quartz, plastic or any suitable materials. A second transparent conductive layer 508 is disposed on second base 506. For example, second transparent conductive layer 508 may be made of conductive polymers including Polythiophene, Polyaniline, Polypyrrole, Polyacetylene, Polyethyne, and the like. After second part 512 is made, second part 512 is positioned that second base 506 is at the bottom and second conductive layer 508 is at the top along the z axis. Second part 512 is parallel to first part 510 and parallel to the x-y plane as shown in FIG. 5.

Spacers 514 are disposed on second part 512, and first part 510 is disposed on spacers 514, forming DOE 500. Spacers 514 are interposed between first part 510 and second part 512, and separate first part 510 and second part 512. In this manner, first part 510 and second part 512 are positioned such that first conductive layer 504 is facing second conductive layer 508. Air is in the gap between first conductive layer 504 and second conductive layer 508. The gap between first conductive layer 504 and second conductive layer 508 may be filled with suitable dielectric materials.

For example, first conductive layer 504 comprises 1D periodical pattern of thickness along the y axis (e.g., a grating along the x axis), and second conductive layer 508 comprises 1D periodical pattern of thickness along the x axis (e.g., a grating along the y axis) for diffracting light. In this manner, the 1D periodical pattern of first conductive layer 504 is perpendicular to the 1D periodical pattern of second conductive layer 508. On the other hand, the 1D periodical pattern of first conductive layer 504 may be the same orientation as the 1D periodical pattern of second conductive layer 508.

It is appreciated that first conductive layer 504 may comprises a 2D periodical pattern of thickness for diffracting light, which is the same as conductive layer 204 of FIG. 2A or conductive layer 304 of FIG. 3A. Second conductive layer 508 may comprise the same 2D periodical pattern of thickness for diffracting light as first conductive layer 506 or a 2D periodical pattern of thickness different from first conductive layer 506.

Figure 6:
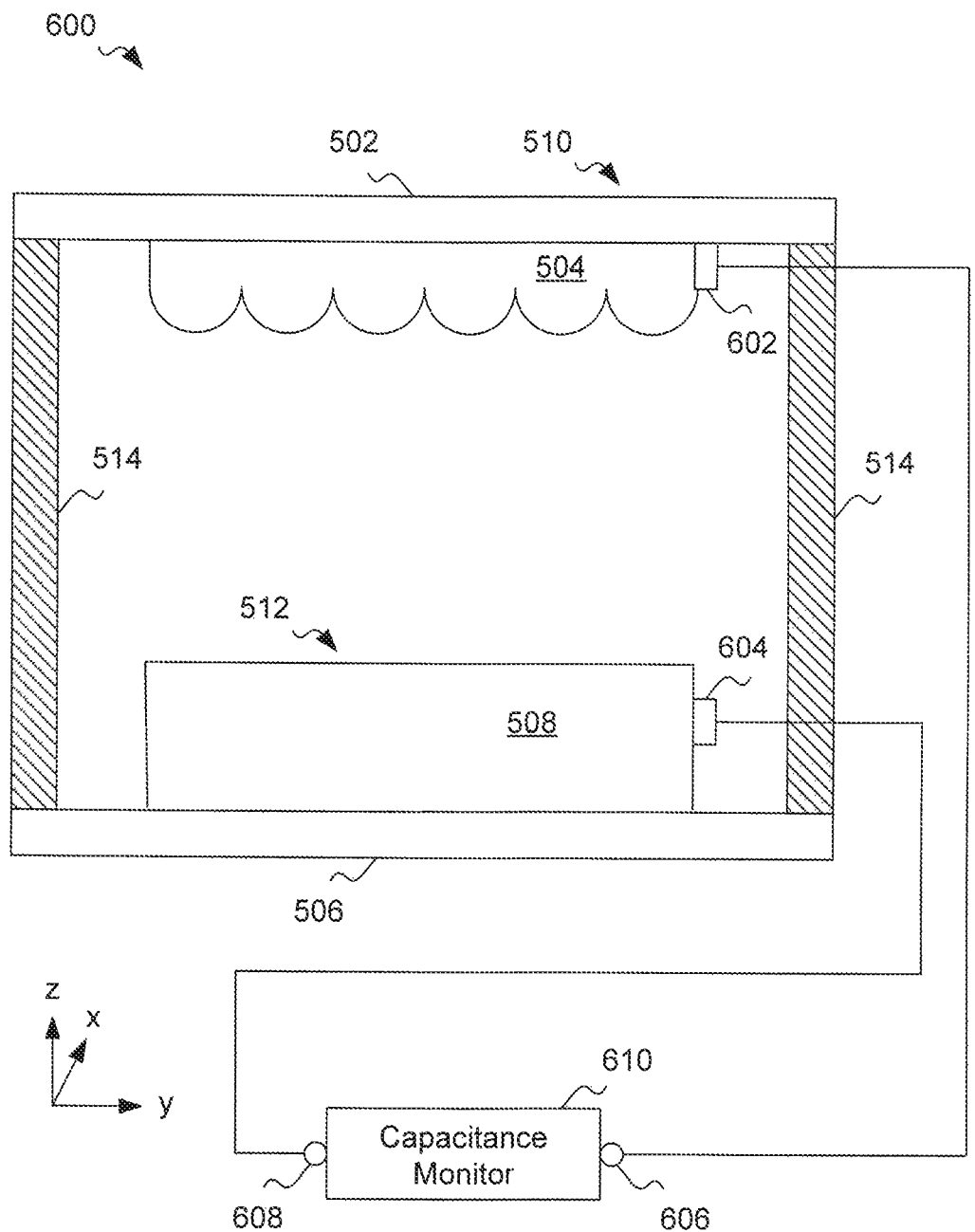
FIG. 6 shows an embodiment for detecting whether the DOE is defective, according to the present invention.

FIG. 6 shows a cross-section 6-6 in FIG. 5, according to an embodiment of the present invention. FIG. 6 shows exemplary DOE 500 comprising first part 510 and second part 512. First part 510 comprises first transparent non-conductive base 502 and first transparent conductive layer 504. Second part 512 comprises second transparent non-conductive base 506 and second transparent conductive layer 508. Spacers 514 are disposed on second non-conductive base 506 of second part 512. First non-conductive base 502 of first part 510 is disposed on spacers 514. First conductive layer 504 is facing second conductive layer 508. For example, first transparent conductive layer 504 and second transparent conductive layer 508 comprise repeated tiny half-cylinders. The structure of DOE 500 forms a capacitor.

FIG. 6 further shows an exemplary embodiment 600 for detecting whether DOE 500 is defective during operation comprising diffracting a laser beam as shown in FIG. 1. For example, a first pad 602 may be mounted to a first end of first conductive layer 504, and a second pad 604 is mounted to a second end of second conductive layer 508. Pads 602 and 604 may have elongated shapes along x axis. First pad 602 is electrically connected to a first terminal 606 of a capacitance monitor 610. Second pad 604 is electrically connected to a second terminal 608 of capacitance monitor 610. Pads 602 and 604 are optional. Capacitance monitor 610 may be directly connected to the first end of first conductive layer 504 and the second end of second conductive layer 508 through its first and second terminals.

Prior to including DOE 500 in a product, for example, a product using embodiment 100 of FIG. 1, the electrical capacitance of DOE 500 across first conductive layer 504 and second conductive layer 508 is measured. During the operation comprising diffracting a laser beam as shown in FIG. 1, the capacitance of DOE 500 across first conductive layer 504 and second conductive layer 508 is constantly monitored by capacitance monitor 610. If the monitored capacitance changes from the value of the capacitance measured before including DOE 500 in product, the operation may be terminated, because DOE 500 may be defective. DOE 500 is for producing structured light for 3D imaging.

Embodiments other than embodiment 100 of FIG. 1 may be employed for generating project the structured light. Various kinds of structured light patterns are possible. The DOEs may comprise 1D or 2D periodical pattern of thickness for diffracting light.

While the present invention has been described herein with respect to the exemplary embodiments and the best mode for practicing the invention, it will be apparent to one of ordinary skill in the art that many modifications, improvements and sub-combinations of the various embodiments, adaptations, and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A diffractive optical element (DOE) comprising:
a transparent non-conductive base;
a transparent conductive layer disposed on the transparent non-conductive base;
wherein the transparent conductive layer has a periodical pattern of thickness for diffracting light;
wherein a first end of the transparent conductive layer is electrically connected to a first terminal of a resistance monitor, and a second end of the transparent conductive layer is electrically connected to a second terminal of the resistance monitor;
wherein the resistance monitor constantly monitors a resistance of the transparent conductive layer during an operation comprising diffracting a laser beam; and
wherein the transparent conductive layer is made of conductive polymers.

2. The DOE of claim 1, wherein the operation comprising diffracting a laser beam is terminated when the resistance monitored changes from a value of a resistance of the transparent conductive layer measured prior to including the DOE in a product.

3. The DOE of claim 1, wherein the conductive polymers include Poly thiophene, Polyaniline, Polypyrrole, Polyacetylene, and Polyethene.

4. The DOE of claim 1, wherein the transparent conductive layer is formed by a nano-imprint lithography process.

5. The DOE of claim 1 further comprising a first pad mounted to a first end of the transparent conductive layer and a second pad mounted to a second end of the transparent conductive layer for electrically connecting to the resistance monitor.

6. The DOE of claim 1, wherein the transparent conductive layer has a 2D periodical pattern of thickness for diffracting light.

7. The DOE of claim 1, wherein the transparent conductive layer has a 1D periodical pattern of thickness for diffracting light.

8. The DOE of claim 1, wherein the DOE is for producing structured light for 3D imaging.

9. A diffractive optical element (DOE) comprising:
a first part comprising:
first transparent non-conductive base;
a first transparent conductive layer disposed on the first transparent non-conductive base;
wherein the first transparent conductive layer has a periodical pattern of thickness for diffracting light;
a second part comprising:
a second transparent non-conductive base;
a second transparent conductive layer disposed on the second transparent non-conductive base;
wherein the second transparent conductive layer has a periodical pattern of thickness for diffracting light;
spacers for separating the first part and the second part;
wherein the first part and the second part are positioned such that the first transparent conductive layer is facing the second transparent conductive layer;
wherein a first end of the first transparent conductive layer is electrically connected to a first terminal of a capacitance monitor, and a second end of the second transparent conductive layer is electrically connected to a second terminal of the capacitance monitor;
wherein the capacitance monitor constantly monitors a capacitance across the first transparent conductive layer and the second transparent conductive layer during an operation comprising diffracting a laser beam; and
wherein the first transparent conductive layer and the second transparent conductive layer are made of conductive polymers.

10. The DOE of claim 9, wherein the operation comprising diffracting a laser beam is terminated when a capacitance monitored changes from the value of a capacitance across the first transparent conductive layer and the second transparent conductive layer prior to including the DOE in a product.

11. The DOE of claim 9, wherein the conductive polymers include Poly thiophene, Polyaniline, Polypyrrole, Polyacetylene, and Polyethyne.

12. The DOE of claim 9, wherein the transparent conductive layer is formed by a nano-imprint lithography process.

13. The DOE of claim 9 further comprising a first pad mounted to the first end of the first transparent conductive layer and a second pad mounted to the second end of the second transparent conductive layer for electrically connecting to the capacitance monitor.

14. The DOE of claim 9, wherein the first transparent conductive layer and the second transparent conductive layer have 1D periodical patterns of thickness for diffracting light.

15. The DOE of claim 14, wherein the 1D pattern of thickness of the first transparent conductive layer is perpendicular to the 1D pattern of thickness of the second transparent conductive layer.

16. The DOE of claim 9, wherein the first transparent conductive layer and the second transparent conductive layer have 2D periodical patterns of thickness for diffracting light.

17. The DOE of claim 9, wherein a gap between the first transparent conductive layer and the second transparent conductive layer is filled with air.

18. The DOE of claim 9, wherein a gap between the first transparent conductive layer and the second transparent conductive layer is filled with a dielectric material.

19. The DOE of claim 9, wherein the DOE is for producing structured light for 3D imaging.

* * * * *